United States Patent
Frot et al.

(10) Patent No.: US 12,241,827 B2
(45) Date of Patent: Mar. 4, 2025

(54) DEVICE AND METHOD FOR DETECTING THE PRESENCE OF GAS HYDRATE CRYSTALS

(71) Applicant: IFP Energies nouvelles, Rueil-Malmaison (FR)

(72) Inventors: Didier Frot, Rueil-Malmaison (FR); Nicolas Gautreau, Rueil-Malmaison (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 81 days.

(21) Appl. No.: 18/034,816

(22) PCT Filed: Oct. 21, 2021

(86) PCT No.: PCT/EP2021/079289
§ 371 (c)(1),
(2) Date: May 1, 2023

(87) PCT Pub. No.: WO2022/096285
PCT Pub. Date: May 12, 2022

(65) Prior Publication Data
US 2023/0400407 A1      Dec. 14, 2023

(30) Foreign Application Priority Data
Nov. 3, 2020   (FR) ...................... 2011248

(51) Int. Cl.
*G01N 21/31*       (2006.01)
(52) U.S. Cl.
CPC ... *G01N 21/31* (2013.01); *G01N 2201/06113* (2013.01)

(58) Field of Classification Search
CPC ..... G01N 2021/4757; G01N 2021/556; G01N 2021/8477; G01N 21/251; G01N 21/31; G01N 2201/06113
See application file for complete search history.

(56) References Cited

U.S. PATENT DOCUMENTS

| 4,826,327 A | 5/1989 | Michell |
| 4,946,288 A | 8/1990 | Siska et al. |

(Continued)

FOREIGN PATENT DOCUMENTS

| EP | 3142201 A1 | 3/2017 |
| FR | 2984504 A1 | 6/2013 |

(Continued)

*Primary Examiner* — Hina F Ayub
(74) *Attorney, Agent, or Firm* — FITCH, EVEN, TABIN & FLANNERY, LLP (57) ABSTRACT

The present invention relates to a device and to a method for detecting at least the presence of gas hydrate crystals (10) formed by a fluid.

The device according to the invention comprises: a polychromatic light source (2) likely to emit a radiation (20) at least in the visible spectrum; a body (3, 3', 3") comprising a reflecting surface (4) of predefined color in contact with the fluid; means for measuring a light intensity (5) as a function of wavelength, so arranged as to detect a radiation re-emitted in a non-specular manner (21) by reflecting surface (4) when it is illuminated by polychromatic light source (2); means for detecting at least the presence of hydrate crystals (10) from the light intensity measured as a function of wavelength and of at least one predefined threshold.

12 Claims, 4 Drawing Sheets

(56) References Cited

U.S. PATENT DOCUMENTS

| | | | |
|---|---|---|---|
| 10,393,652 B2 * | 8/2019 | Karamavus et al. | G01J 3/02 |
| 2007/0147467 A1 | 6/2007 | Arnold et al. | |
| 2013/0100453 A1 | 4/2013 | Harrison et al. | |
| 2018/0252695 A1 * | 9/2018 | Huang | G01N 21/4738 |

FOREIGN PATENT DOCUMENTS

| | | |
|---|---|---|
| WO | 2016/147535 A1 | 9/2016 |
| WO | 2018/114267 A1 | 6/2018 |
| WO | 2018/114269 A1 | 6/2018 |

* cited by examiner

DEVICE AND METHOD FOR DETECTING THE PRESENCE OF GAS HYDRATE CRYSTALS

CROSS-REFERENCE TO RELATED APPLICATIONS

This application is a U.S. national phase application filed under 35 U.S.C. § 371 of International Application No. PCT/EP2021/079289, filed Oct. 21, 2021, designating the United States, which claims priority from French Application No. 2011248, filed Nov. 3, 2020, which are incorporated herein by reference in its entirety.

FIELD OF THE INVENTION

The present invention relates to the field of monitoring industrial systems comprising essentially gaseous fluids likely to form gas hydrate crystals in a pipe.

More specifically, the present invention relates to the field of monitoring extraction, production and/or transport pipes for hydrocarbons comprising at least a gas phase and an aqueous liquid or gas phase, and/or any other fluid likely to form hydrate, clathrate or semi-clathrate crystals.

More particularly, the present invention relates to the field of monitoring extraction, production and/or transport pipes for hydrocarbons comprising water and at least a gas phase likely to form hydrate, clathrate and semi-clathrate crystals, and possibly a liquid phase (aqueous and/or hydrocarbons), water being present in at least one of the phases involved.

The invention may further concern the field of monitoring gas processing and/or gas liquefaction systems, or gas processing methods in general, as well as gas capture, post-capture compression and storage facilities, and, in general, the field of industrial systems with a very high gas/liquid ratio where gas hydrates are likely to form.

Gas hydrates are crystals comprised of a network of water molecules stabilized by hydrate formers (such as methane $CH_4$, $CO_2$, $H_2S$, $C_2H_6$, $C_3H_8$, . . . ). Gas hydrates form under high pressure and low temperature conditions. If these crystals form, they grow, agglomerate and may eventually clog pipes. Clogging remediation is long, difficult and expensive, or even dangerous. Currently, operators implement extensive and costly technical solutions to prevent formation of such crystals, which may be oversized compared to the real risk for lack of reliable hydrate risk monitoring systems.

In particular, a fluid likely to form gas hydrate crystals and having a low water content (less than about 200 ppm) can directly change from a gaseous state to the formation of hydrate crystals due to a drop in temperature, without going through a liquid condensed water phase. Such a fluid therefore requires particularly reliable monitoring means in order to anticipate hydrate risks.

BACKGROUND OF THE INVENTION

Cells for studying the capacity of a system consisting of liquid and gas to form gas hydrates are known. In laboratory installations, pilot and/or industrial plants, gas hydrate formation is detected either by a temperature increase because crystallization is exothermic, or, when the working device is respectively closed or semi-closed (allowing the pressure to be maintained), by a pressure drop or by a sudden gas consumption. It is also possible to detect hydrate formation by visual examination. It should be emphasized that, in most of these methods, it is necessary to form (or to dissociate) a large number of hydrate crystals to obtain a significant signal. In the case of gas systems with low water contents, equilibrium cells with water content measurement by gas chromatography or coulometry are used.

Document FR-298,450 A1 relates to a device and to a method for detecting the presence of gas hydrates, the device comprising: an optical fiber with a thermal coupler at the end thereof, temperature severization means arranged against the thermal coupler, means for measuring the intensity of the optical signal emitted by the optical fiber, and means of contacting the thermal coupler with a gaseous fluid likely to form a hydrate. However, the device described in this document detects a deposit on the optical fiber in solid form as well as in liquid form. In other words, the device described in this document does not allow a solid phase to be detected with certainty because the detected deposit may be either liquid or solid.

Documents WO-2018/114,269 A1 and WO-2018/114,267 A1 respectively concern a device and a method for discrimination between ice and hydrate crystals from a laser source, a temperature measurement means and a simplified Raman spectrometer, more precisely by means of two band-pass filters for extracting the light intensities corresponding to the Raman spectra of two vibrational modes, free (condensed water) or bonded (hydrate crystals), of the OH bonds. This device and this method do not allow to distinguish the presence of liquid in relation to the presence of solid crystals, notably to make such a discrimination in the case of low water contents (<200 ppm), because the Raman signal shows no detectable amplitudes in this case. Indeed, the cross-section of the Raman lines being small, analysis using this spectroscopy type requires a minimum amount of material.

Document EP-3,142,201 A1 relates to the identification of the chemical nature, hydrocarbon phase or aqueous phase, of a condensed phase by means of low-cost optical spectroscopy. However, the device described in this document does not enable gas hydrate identification.

Document U.S. Pat. No. 4,826,327 A1 concerns the identification of the dew point (liquid water condensation) using a device comprising means for thermally severizing a mirror, and a photodetector. The method described in this document exploits the decrease in amplitude of the specular reflection produced by a condensed liquid phase. However, this document does not enable detection of gas hydrate crystals.

The present invention allows these drawbacks to be overcome. Notably, the device and the method according to the invention allow to reliably detect the presence of gas hydrate crystals on the surface of a body, without confusing these crystals with a liquid condensation, even in case of low water content. In particular, the present invention exploits in white light, on an optically processed surface, the effect of multiple light scattering to detect the presence of crystallographic defects on the surface considered.

A main variant of the device and of the method according to the invention further allows to reliably detect the presence of liquid condensation on the surface of a body.

A second main variant of the device and of the method according to the invention allows to monitor an industrial system likely to form hydrate crystals, notably to anticipate the formation of gas hydrate crystals, using means of adjusting the temperature of the surface of a body.

SUMMARY OF THE INVENTION

The present invention relates to a device for detecting at least the presence of gas hydrate crystals formed from a fluid likely to form gas hydrate crystals. The device according to the invention comprises:

A. a polychromatic light source likely to emit a radiation at least in the visible spectrum;

B. a body whereof at least a portion is in contact with said fluid, said portion of said body comprising a reflecting surface having a predefined color, said predefined color being associated with a wavelength range in the visible spectrum;

C. means for measuring a light intensity as a function of wavelength, so arranged as to detect a radiation re-emitted in a non-specular manner by said reflecting surface of said portion of said body having a predefined color when said reflecting surface of said portion of said body having a predefined color is illuminated by said polychromatic light source;

D. means for detecting at least said presence of hydrate crystals from said light intensity measured as a function of wavelength and of at least one predefined threshold.

According to an implementation of the invention, said polychromatic light source can be a white LED source.

According to an implementation of the invention, said predefined color of said reflecting surface of said portion of said body can be red.

According to an implementation of the invention, said means for measuring a light intensity as a function of wavelength can comprise a spectrometer.

According to an implementation of the invention, said means for measuring a light intensity as a function of wavelength can comprise a photodetector sensitive to the wavelengths of the visible spectrum, to the exclusion of said wavelength range associated with said predefined color of said reflecting surface of said portion of said body.

According to an implementation of the invention, said device can further be able to detect the presence of a liquid phase on said reflecting surface of said portion of said body, and said device can further comprise:

a monochromatic light source emitting in said wavelength range associated with said predefined color of said reflecting surface of said portion of said body, and supplementary means for measuring a light intensity as a function of wavelength, comprising a photodetector sensitive to said wavelength range associated with said predefined color of said reflecting surface of said portion of said body, and so arranged as to detect a radiation resulting from an emission by said monochromatic light source and specularly reflected on said reflecting surface of said portion of said body.

According to an implementation of the invention, said monochromatic light source can be a laser.

According to an implementation of the invention, said body can be a metal cylinder whose one end can be anodized, said anodized end corresponding to said reflecting surface of said portion of said body having a predefined color.

According to an implementation of the invention, said device can further comprise means for adjusting the temperature of at least said reflecting surface of said portion of said body.

The invention further concerns a method for detecting at least the presence of gas hydrate crystals formed from a fluid likely to form gas hydrate crystals, said method being implemented by means of the device for detecting at least the presence of gas hydrate crystals formed by said fluid as described above, said method comprising at least the following steps:

I. emitting, by means of said polychromatic light source, a radiation at least in the visible spectrum through said fluid;

II. measuring, using said means for measuring a light intensity as a function of wavelength, a light intensity as a function of the wavelength of a radiation re-emitted in a non-specular manner by said reflecting surface of said portion of said body having a predefined color when said reflecting surface of said portion of said body having a predefined color is illuminated by said polychromatic light source;

III. determining that hydrate crystals are present on said reflecting surface of said portion of said body at least if said light intensity measured as a function of wavelength is above said predefined threshold for at least one wavelength outside said wavelength range associated with said predefined color of said reflecting surface of said portion of said body.

According to an implementation of the invention, said predefined threshold can be at least equal to the detection threshold of said means for measuring a light intensity as a function of wavelength.

According to an implementation of the invention, at least steps a) to c) can be repeated for a plurality of decreasing temperatures of said reflecting surface of said portion of said body, said temperature of said reflecting surface of said portion of said body being lowered using said means for adjusting the temperature of at least said reflecting surface of said portion of said body, and a formation temperature can further be determined for said gas hydrate crystals.

BRIEF DESCRIPTION OF THE FIGURES

Other features and advantages of the method according to the invention will be clear from reading the description hereafter of non-limitative example embodiments, with reference to the accompanying figures wherein.

DETAILED DESCRIPTION OF THE EMBODIMENTS

According to a first aspect, respectively a second aspect, the invention concerns a device, respectively a method, for detecting the presence of gas hydrate crystals formed from a fluid. According to a first main variant, the invention concerns a device, respectively a method, for distinguishing the presence of a liquid phase from the presence of gas hydrate crystals formed from a fluid. The fluid according to the invention is likely to form gas hydrate crystals. In general, the fluid of interest is essentially gaseous. It comprises at least a gas (for example, but not limited to, a hydrocarbon type gas such as methane) and water. The water can be in the gaseous or liquid state in the fluid considered, and in various proportions relative to the gas or to the gas mixture.

The device and the method according to the invention exploit the fact that the presence of gas hydrate crystals on an initially perfectly reflecting surface generates diffuse reflection due to the presence of crystallographic defects, and no specular reflection when these crystals are illuminated by a polychromatic light source emitting light in the visible range. In addition, the device and the method according to the invention exploit the fact that, when the surface illuminated by the white light is itself colored, it sends back a radiation emitting only in a wavelength range associated with the color of this colored surface, when no phase is present on this surface, or in the case of a transparent phase (water drops for example). These properties make it possible to detect with certainty the presence of a gas hydrate crystal deposit on the surface of a body, without confusing it with a liquid condensation.

Figure 1:
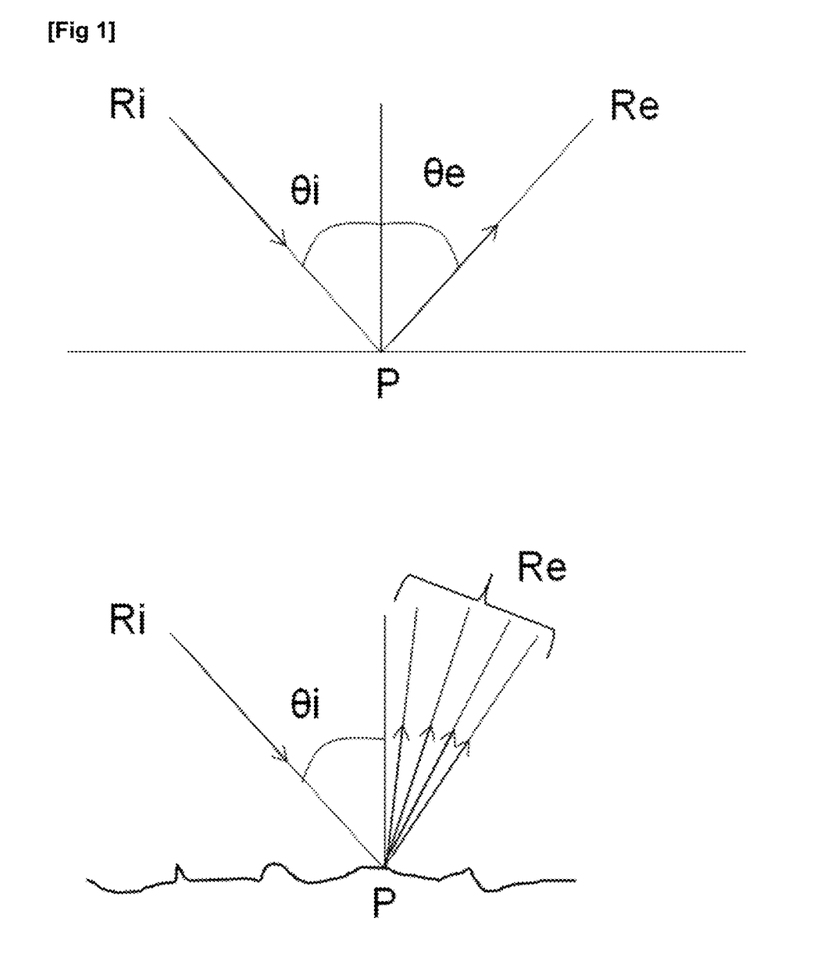
FIG. 1 schematically shows a specular reflection (top) and a diffuse reflection (bottom) on a surface.

The device according to the invention comprises at least:

a polychromatic light source likely to emit a radiation at least in the visible spectrum. It is clear that a polychromatic light source can emit in the non-visible spectrum, but the method according to the invention exploits the visible part of the spectrum of such a polychromatic source. According to an implementation of the invention, the polychromatic light source can be a white light source, a body whereof at least a portion is in contact with the fluid likely to form gas hydrates, the body portion comprising a reflecting surface with a predefined color. A reflecting surface is understood to be a surface whose irregularities have dimensions 20 times smaller than the wavelengths of the visible spectrum. The body can have any shape, such as cylindrical or parallelepipedic for example. According to the invention, a portion (i.e. a part) of this body is contacted with the fluid likely to form gas hydrates, and a surface of this portion is characterized by a predefined color (by way of non-limitative example, red, green, blue, etc.). It is clear that the predefined color of the surface of the body portion is defined by a range of wavelengths in the visible spectrum (for example, the wavelength range associated with the color red can be defined as ranging between 620 and 670 nm, for a central value of 645 nm). Subsequently and for description simplification purposes, reference will be made to "colored surface" of the body. The fact that the surface of the body portion has a predefined color has the effect that a radiation in the visible spectrum on this colored surface (in the absence of deposit on the surface, or in the presence of a transparent phase such as liquid water) leads to a (specularly) reflected radiation (mainly) comprising only the wavelengths of the wavelength range associated with the color of the colored surface, means for measuring a light intensity as a function of wavelength, these means being so arranged as to detect a radiation re-emitted in a non-specular manner by the colored surface of the support when the colored surface is illuminated by the polychromatic light source. Specular re-emission is understood to be a reflection at a point of a surface such that the incident ray produces a single reflected ray. The angle of emergence of a specular reflection is thus perfectly known and equal (at least in absolute value) to the angle of incidence at the reflection point. In the device according to the invention, the means for measuring a light intensity as a function of wavelength are therefore arranged so as not to be on the optical path of a specular ray, whose incident ray is defined by a line passing through the polychromatic light source and the colored surface of the body. In other words, these means are arranged on a line passing through the colored surface whose angle relative to the normal to the colored surface is distinct (by at least 5 degrees for example) from the angle formed between the line passing through the light source and the colored surface and the normal to the colored surface. This arrangement of the means for measuring a light intensity as a function of wavelength is intended to measure the intensity of a diffuse reflection, as opposed to an intensity of a specular reflection. The reflection is referred to as diffuse when the light is reflected in a large number of directions, the energy of the incident radiation being redistributed in a plurality of re-emitted rays. A diffuse reflection is generated by a surface comprising refraction index heterogeneities of dimension comparable to the wavelength used, which is the case in the presence of solid gas hydrate crystals on the colored surface. A schematic example of specular reflection is shown at the top of FIG. 1, where Ri is an incident ray (actually a beam) with an angle $\theta i$ at a reflection point P, leading to an emergent ray Re with an angle $\theta e$ equal to angle $\theta i$. The case of a diffuse reflection where incident ray Ri of angle of incidence $\theta i$ at point P leads to a plurality of emergent rays Re with angles different from angle of incidence $\theta i$ is shown at the bottom of FIG. 1, means for detecting the presence of hydrate crystals from the light intensity measured as a function of wavelength and a predefined threshold. The means for detecting the presence of gas hydrate crystals can comprise means for analyzing the light intensity measured as a function of wavelength producing spectrograms, and means for processing the latter, such as a computer or a smartphone. By way of non-limitative example, analysis of the measured light intensity can be performed from an analog or digital signal of the light signal measured as a function of wavelength. According to an implementation of the invention, detection of the presence of hydrate crystals can be performed at least by comparing the light intensity measured as a function of wavelength with a predefined threshold. According to an implementation of the invention, the predefined threshold can be relative to at least a predefined wavelength range in the visible spectrum, as described hereafter.

According to an implementation of the invention, the polychromatic light source likely to emit a radiation in the visible spectrum can be a halogen source or a LED (Light Emitting Diode) source.

Figure 4:
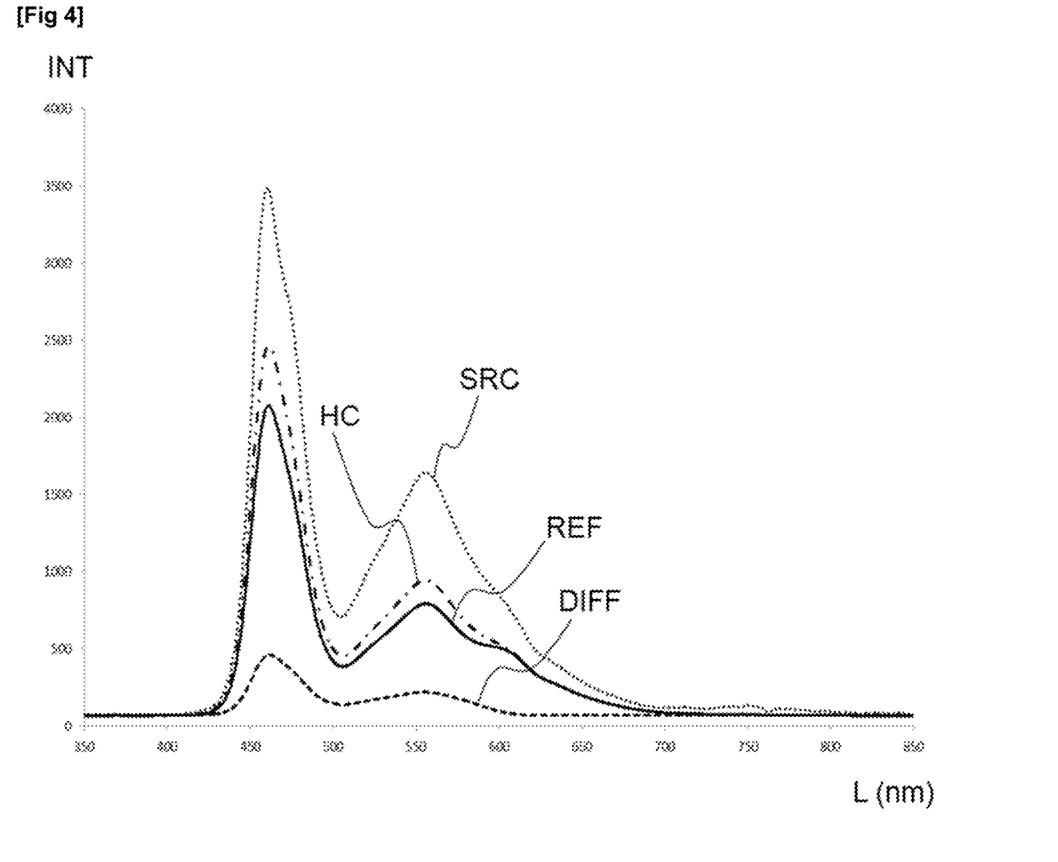
FIG. 4 shows light intensity curves as a function of wavelength measured within the context of an example of application of the first main variant of the device and of the method according to the invention.

According to a preferred embodiment of the invention, the polychromatic light source likely to emit a radiation in the visible spectrum can be a white LED source, of 4000° K for example. Such a source allows to guarantee a white light, for a limited cost and a very high electro-luminescent efficiency. Indicatively, an example of spectrum of such a source is shown in FIG. 4 (curve SRC). As can be seen in the figure, a 4000° K LED produces a fluorescence light with much intensity in the complementary range to red (420-600 nm), which is a significant advantage in relation to a conventional halogen source that contains radiations in the infrared range that are unexploited in the device and/or the method according to the invention.

According to an embodiment of the invention, the body at least a portion of which is in contact with the fluid of interest can be a cylinder, and the surface of this portion having a predefined color can be at least one of the plane faces of the cylinder intended to be contacted with the fluid of interest.

Advantageously, the cylinder is a metal cylinder whereof at least the face intended to be contacted with the fluid of interest has been anodized, i.e. this face has been coated with a surface treatment for tinting it, by anodic oxidation. Advantageously, the porous oxide layer tinted in the mass of this face allows this face of the cylinder to have the optical properties of a single color while keeping a high thermal conductivity and heat capacity. Thus, the thermal gradient between the end (where the solid or liquid condensed phase appears) and the body of the cylinder is minimized, which also allows the temperature increase accompanying the condensation of species to remain negligible. This choice affords the advantage of high mechanical strength and small thickness (30 to 100 microns) for the colored layer forming the end of the cylinder, therefore low thermal disturbance.

According to an implementation of the invention, the colored surface of the body can be red. This color is advantageous because it is at the end of the visible spectrum corresponding to the long wavelength range whose contribution to Rayleigh scattering, produced by the presence of crystals, is low.

Preferably, it is possible to combine a red-colored surface of the body with a polychromatic light source of white LED source type, of 4000° K for example. Indeed, a white LED source exploits, from a LED centered on the 465-nm wavelength range (color blue), the fluorescence excitation of a chemical compound to produce a white light that remains blue-rich. Using such a source is thus advantageous with a colored surface of the body in a range of different wavelengths, in particular red. This light source choice is also judicious since the contribution to the phenomenon of short wavelength diffusion is much higher. Thus, this combination of embodiments of the device according to the invention contributes to early detection of the first crystals deposited on the colored surface of the body.

According to an implementation of the invention, the means for measuring a light intensity as a function of wavelength can be a spectrometer such as, by way of example, the USB2000+ model marketed by the Ocean Insight company (USA), which combines a diffraction grating and a linear CCD (Charge Coupled Device) detector.

Alternatively, the means for measuring a light intensity as a function of wavelength can be formed from a photodetector sensitive to the visible spectrum wavelengths, to the exclusion of the wavelength range associated with the predefined color of the colored surface of the body. Thus, the means for measuring a light intensity as a function of wavelength are sensitive only to the diffused intensity produced by the appearance of crystals. According to an embodiment of the invention, the means for measuring a light intensity as a function of wavelength can be made up of a photodiode and a band-stop filter centered on the wavelength range associated with the color of the colored surface of the body.

According to an implementation of the invention, the means for measuring a light intensity as a function of wavelength can be arranged so as to have an angle of at least degrees, preferably at least 10 degrees and more preferably 20 degrees, relative to a specular emergent radiation on the colored surface. A 5-degree angle is enough so that the means for measuring a light intensity as a function of wavelength do not receive a light intensity from a specular reflection on the colored surface of the body.

According to an implementation of the invention, the means for detecting the presence of hydrate crystals from the measured light intensity can determine the presence of gas hydrate crystals by comparing the light intensity measured for at least one wavelength range with at least one predefined threshold. Advantageously, the presence of gas hydrate crystals may be inferred when the light intensity measured for the wavelengths of a wavelength range excluding at least the wavelength range associated with the color of the colored surface of the body is above a first predefined threshold (for example at least equal to the detection threshold of the light intensity measurement device; more precisely, the predefined threshold can be at least equal to an increase in a reference light intensity (measured beforehand, when no deposit has formed on the colored surface) equal to the detection threshold of the light intensity measurement device) and/or when the light intensity measured for the wavelength range associated with the color of the colored surface of the body is below a second predefined threshold (for example equal to a 10% decrease of a reference light intensity, measured beforehand when no deposit has formed on the colored surface). Preferably, the presence of gas hydrate crystals may be inferred when the difference between the light intensity measured for a complementary wavelength range (for example, the complementary wavelength range to the wavelength range associated with the color red is the shorter wavelength range associated with the color green) and the wavelength range associated with the color of the colored surface of the body is above a first predefined threshold.

According to another implementation of the invention, a reference spectrum can be measured in the absence of deposit on the colored surface, and this reference spectrum is subtracted from the measured spectrum. If the sum of the differences is above a predefined threshold (for example equal to 10 times the detection threshold of the means for measuring a light intensity as a function of the wavelength used), the presence of gas hydrate crystals on the colored surface may be inferred.

According to an implementation of the invention, the means for detecting the presence of hydrate crystals from the light intensity measured as a function of wavelength can further comprise alert means intended to signal when hydrate crystals are forming. According to this implementation of the invention, this alert can be triggered when the light intensity measured for the wavelengths of a wavelength range excluding at least the wavelength range associated with the color of the colored surface is above at least the predefined threshold as described above. According to an implementation, the alert can be triggered in form of a visual or audible warning. According to an implementation, the alert means can be positioned in immediate proximity to the device or they can provide remote alert, for example via an electronic mail sent from a smartphone and/or a computer.

According to a first main variant of the device of the invention, the device can further be able to detect the presence of a liquid phase. In other words, the device according to the invention thus allows to distinguish the presence of a liquid phase from the presence of gas hydrate crystals. According to this variant, the device can further comprise a monochromatic light source whose wavelength range corresponds to the predefined color of the colored surface of the body. In addition, according to this variant, the means for measuring a light intensity as a function of wavelength can also comprise a photodetector sensitive to the wavelength range associated with the predefined color of the colored surface of the body, this photodetector being additionally so arranged as to detect a radiation resulting from an emission by the monochromatic light source and being specularly reflected by the colored surface of the body. In other words, what is emitted by this additional monochromatic light source is a radiation of the same color as that of the colored surface to be illuminated, which will send back this radiation, in case of specular reflection, to a photodetector suited to measure the light intensity of this monochromatic radiation.

According to this first main variant of the invention, the means for detecting the presence of gas hydrate crystals can further enable analysis of the light intensity measured by the photodetector of this main variant of the invention. As described above, no specular reflection occurs in the presence of gas hydrate crystals on the colored surface, since they generate a diffuse reflection phenomenon, and not a specular reflection phenomenon. Once the light intensity measured by the photodetector of this main variant of the invention decreases significantly, i.e. at least by 10%, relative to a reference light intensity previously measured by the photodetector in the absence of condensation on the colored surface of the body, the presence of a (solid or liquid) condensed phase on the colored surface of the body may be inferred. Preferably, when this first main variant is combined with the second main variant of the invention described below, the reference light intensity can be measured prior to any thermal severization, so as to prevent the effect of potential fouling of the colored surface on the light intensity measurement.

According to an implementation of this first main variant of the invention, it is possible to determine if the (solid or liquid) condensed phase thus detected on the colored surface is a liquid or a solid phase as follows:
 if the light intensity as a function of wavelength measured for a wavelength range associated with the color of the colored surface of the body by the means for measuring a light intensity as a function of wavelength so arranged as to detect a radiation re-emitted in a non-specular manner by the colored surface is below a predefined threshold as described above, it may be inferred that the (solid or liquid) condensed phase detected on the colored surface is a liquid phase,
 if the light intensity as a function of wavelength measured for a wavelength range excluding at least the wavelength range associated with the color of the colored surface of the body, said light intensity being measured by the means for measuring a light intensity as a function of wavelength so arranged as to detect a radiation re-emitted in a non-specular manner by the colored surface is above a predefined threshold as described above, it may be inferred that the (solid or liquid) condensed phase detected on the colored surface is a solid phase corresponding to gas hydrate crystals.

In other words, the combined analysis of the light intensities measured over a specular optical path and a non-specular optical path allows to distinguish whether a condensed phase on the colored surface of the body is liquid or if it corresponds to gas hydrate crystals.

According to an implementation of this first main variant of the invention, the monochromatic light source can be a laser, red for example when the colored surface of the body is red, or green when the colored surface of the body is green. Colors other than red, although less optimal for crystal detection when a polychromatic light source of white LED type is used, as discussed above, can be advantageously calibrated on a wavelength of a laser emission. Indeed, while avoiding the blue wavelength range of a white LED source, it is possible for example to color the surface of the body in green and use a green YAG laser of wavelength 532 nm.

According to an implementation of this first main variant of the invention, the photodetector sensitive to the wavelength range associated with the predefined color of the colored surface of the body can comprise a photodiode and a band-pass filter centered on the wavelength range associated with the color of the colored surface of the body.

According to a second main variant of the device of the invention that may be combined with the first main variant described above, the device can further comprise means for adjusting the temperature of at least the colored surface of the body. The temperature adjustment means are thus intended to modify the temperature of at least the colored surface of the body, and they can be exploited by the method according to the invention, as described hereafter, in order to condense on the cooled colored surface a denser liquid or solid phase. According to this variant embodiment of the invention, the means for adjusting the temperature of at least the surface of the body portion contacted with the fluid of interest can comprise at least one Peltier element arranged against a thermal coupler, itself in contact with at least the colored surface of the body according to the invention. The Peltier element allows to control the temperature of at least the colored surface of the body by direction and amplitude servo control of a current. Without departing from the scope of the present invention, the thermal coupler can be surrounded by two Peltier elements. These means for adjusting the temperature of at least the end of the colored surface of the body will be referred to as thermal severization means hereafter.

Advantageously, the device can comprise a multimode optical fiber and a Y coupler to provide optical connection of the polychromatic light source and of the light intensity measurement means, even in an industrial gas production environment (ATEX standard). In this embodiment, collection of the light intensity scattered by the reflecting colored surface is provided at the end of the optical fiber by an optical coupling fiber having a collection adjustment with a solid adjustable angle modulating the numerical aperture of the multimode fiber selected.

Figure 2:
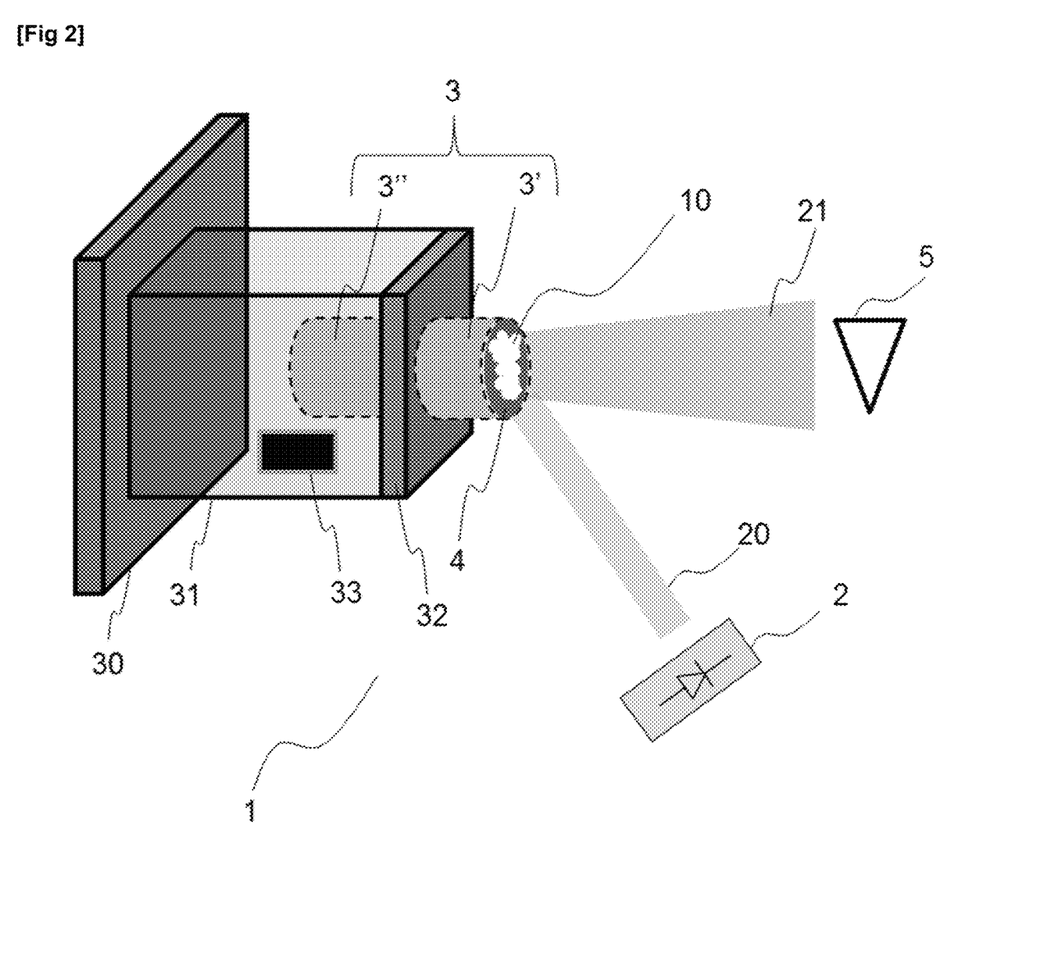
FIG. 2 shows a non-limitative embodiment of the device according to the invention.

FIG. 2 shows a non-limitative embodiment of the device according to the invention. More precisely, device 1 according to this embodiment comprises a polychromatic light source 2 (a white LED for example) emitting at least in the visible spectrum. This emitted radiation 20 illuminates at least the colored face 4 of a portion 3' of a metal cylinder 3 contacted with the fluid (not shown) likely to form gas hydrate crystals. The other portion 3" of metal cylinder 3, not in contact with the fluid, is encased in a cold plate 31 through an adiabatic plate 32, cold plate 31 being fixed to a support 30. The temperature of the cold plate is adjusted through thermal severization means 33. Plane face 3' of the metal cylinder in contact with the fluid has been anodized, which allows the thermal gradient in cylinder 3 to be minimized. Besides, as can be seen in the figure, a spectrometer 5 is arranged on an optical path which is not the path of a specular ray that would be generated by light source 2 and would reflect on colored face 4 of cylinder 3. Solid gas hydrate crystals 10 are schematically represented by white disks on colored face 3' of cylinder 3. These crystals generate a diffuse reflection 21 whose light intensity as a function of wavelength is measured by spectrometer 5.

Figure 3:
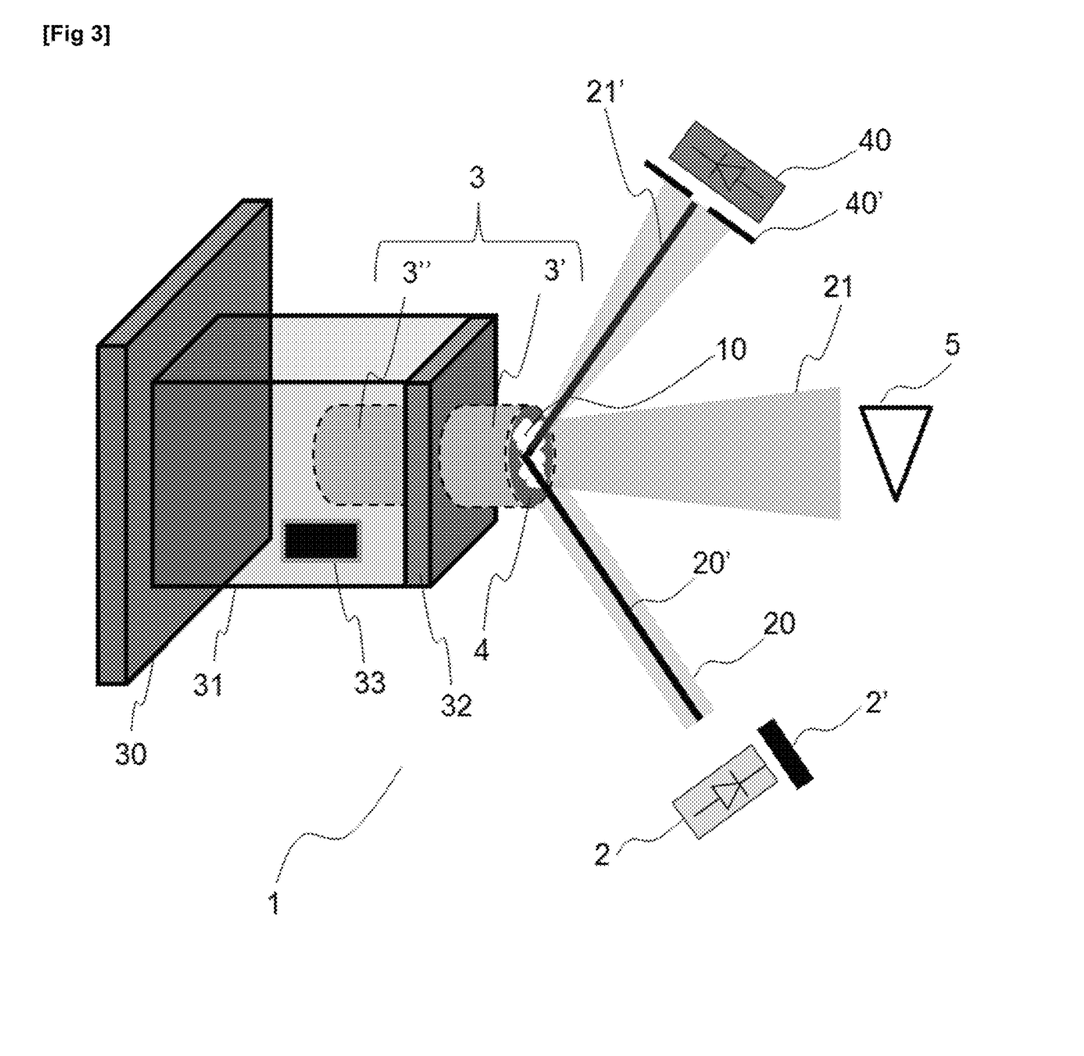
FIG. 3 shows a non-limitative embodiment of the device according to the first main variant of the invention.

FIG. 3 shows a non-limitative embodiment of the device according to the first main variant of the invention. This embodiment comprises the elements described in connection with FIG. 2 above, as well as a monochromatic light source 2' (a laser for example) arranged close to polychromatic source 2, and a photodetector 40, 40' sensitive to the wavelength range associated with the predefined color of colored surface 4 of body 3, so arranged as to detect a radiation 21' resulting from an emission by monochromatic light source 2' and specularly re-emitted by colored surface 4 of body 3. According to this embodiment, photodetector 40, 40' comprises a photodiode and a band-pass filter 40' centered on the wavelength range associated with the color of colored surface 4 of body 3.

The method for detecting at least the presence of gas hydrate crystals formed from a fluid according to the second aspect of the invention can be implemented using the device for detecting at least the presence of gas hydrate crystals described according to any one of the above embodiments.

The method according to the invention comprises at least the following steps:
- a) emitting, by means of the polychromatic light source described above, a radiation at least in the visible spectrum through said fluid;
- b) measuring a light intensity as a function of wavelength, using the means for measuring a light intensity as a function of wavelength described above, of a radiation re-emitted in a non-specular manner by said surface of said body having a predefined color when said surface of said body having a predefined color is illuminated by said polychromatic light source;
- c) determining that hydrate crystals are present on the surface of the portion of the body if at least said light intensity measured for at least a wavelength distinct from said wavelength range associated with said predefined color of said surface of said portion of said body is above a predefined threshold.

Advantageously, the predefined threshold is equal to the detection threshold of the means for measuring a light intensity as a function of wavelength. In other words, the presence of gas hydrate crystals may be inferred when a non-zero light intensity is measured for at least a wavelength distinct from the wavelength range associated with the predefined color of said surface by the measurement device used as means for measuring a light intensity as a function of wavelength.

Advantageously, an alert can be triggered when the light intensity measured as a function of wavelength for at least a wavelength distinct from the wavelength range associated with the predefined color of the surface of the portion of the body is above a predefined threshold. According to an implementation of the invention, an alert can be triggered in form of a visual or audible warning, or in form of an electronic mail sent from a smartphone and/or a computer.

According to an implementation of the method according to the invention, steps a) to c) can be repeated for a plurality of decreasing temperatures of the colored surface of the portion of the body, the temperature of the colored surface of the body being lowered using the thermal severization means of the device according to the second main variant described above. The colored surface temperature at which the presence of hydrate crystals is detected indicates the hydrate crystal formation temperature for the fluid of interest. This is valuable information for the operator of an industrial system likely to generate gas hydrates since it contributes to anticipating the formation of these hydrate crystals.

The method according to the invention can further allow to detect the presence of a liquid phase by carrying out the following steps:
- i) emitting a radiation through the fluid by means of the monochromatic light source,
- ii) measuring, using the means for measuring a light intensity as a function of wavelength comprising a photodetector sensitive to the wavelength range associated with the color of the colored surface of the body, a light intensity as a function of the wavelength of a radiation specularly re-emitted by the colored surface, when the colored surface is illuminated by the monochromatic source,
- iii) determining that a liquid phase is present on the reflecting surface:
    if the light intensity as a function of the wavelength of the radiation specularly re-emitted by the colored surface, when the colored surface is illuminated by the monochromatic light source, is below a predefined threshold (for example equal to a 10% decrease relative to a reference light intensity, previously measured by the photodetector in the absence of condensation on the colored surface of the body), and
    if the light intensity as a function of the wavelength of the radiation re-emitted in a non-specular manner by the colored surface, when the colored surface is illuminated by the polychromatic light source, is below the threshold predefined in step c) described above for at least a wavelength distinct from the wavelength range associated with the predefined color of the colored surface.

Thus, the method according to the invention allows to reliably distinguish the presence of a liquid phase from the presence of gas hydrate crystals.

In particular with the aim of monitoring an industrial system, the device according to the invention can be advantageously installed in the fluid stream to be monitored or, alternatively, in a branch line bypassing the main stream.

In particular, implementing such a device or such a method with the aim of monitoring an industrial system allows to know in real time the departure from equilibrium of the hydrates and/or semi-clathrates likely to form, since measurements are performed in situ, unlike laboratory measurements that require reconstitution of the gas mixture at a different time. The device and the method according to the invention can be advantageously used to assess and/or to "control" in real time the effect of an injection of thermodynamic or kinetic additives, or of a combination thereof, in the industrial process. The first additive type (thermodynamic) shifts the equilibrium conditions, the second (kinetic) slows down the formation kinetics and therefore delays the appearance of crystals.

EXAMPLES

Other features and advantages of the method according to the invention will be clear from reading the application example hereafter.

For this application example, the method according to the first main variant of the device according to the invention, as described in FIG. 3 for example, is implemented. The fluid of interest comprises methane and water in liquid form, in a proportion causing generation of a liquid phase prior to the formation of gas hydrate crystals.

More precisely, for this application example, the body is a metal cylinder with a red reflecting surface (red anodization), and a 4000° K LED is used as the polychromatic light source, as well as a red laser as the monochromatic light source. Besides, a spectrometer is used to measure a light intensity resulting from a diffuse reflection, and a photodiode comprising a band-pass filter centered on the 645 nm wavelength (more precisely, whose bounds are 620 and 670 nm) is used to measure a light intensity resulting from a specular reflection on the colored surface of the metal cylinder.

The spectrometer, prior to any thermal severization (therefore in the absence of gas hydrate crystals), receives part of the light from the 4000° K LED, significantly increased by the red component corresponding to the re-emission by the red reflecting surface of the metal cylinder, indicating that the detector is operational. The temperature of the red face of the metal cylinder is subsequently gradually lowered using the thermal severization means.

When the water of the fluid of interest condenses on the red reflecting face of the metal cylinder, the spectrum recorded by the spectrometer is not or little affected due to the transparency of the water drops. It is therefore mainly the red light that is received by the spectrometer. On the other hand, the light intensity level of the photodetector arranged on a specular optical path decreases because the diffuse reflection, a deviation produced by the larger water drops mainly at small angles, no longer contributes to the intensity received by the photodetector.

As the temperature of the colored face of the metal cylinder continues to decrease, hydrate crystals form, taking the shape of a multitude of small crystallographic defects. The spectrum recorded by the spectrometer is very different because the multiple scattering phenomenon concerns all the spectral components of the 4000° K white LED source. It is therefore mainly white light that is received by the spectrometer since no more intensity is observed in the wavelength range beyond 600 nm. The red component corresponding to the reflecting deposit on the colored surface is strongly attenuated. The photodetector receives less or even no more specularly reflected light from the colored face of the cylinder. In the latter case, the specular reflection has entirely disappeared. The presence of a (solid or liquid) condensed phase formed on the colored surface of the body can therefore be inferred.

An example of a real spectrum (light intensity I as a function of wavelength L) measured by the spectrometer prior to the formation of hydrate crystals (REF) and after the formation of hydrate crystals (HC) is shown in FIG. 4. It is noted that the signal of the red reflector in the (620-670 nm) wavelength range has nearly completely disappeared when the crystals have appeared, and it is replaced by a complementary spectrum in the (420-600 nm) range. This is particularly clear when observing curve DIFF corresponding to the difference between the two curves HC and REF. These non-zero light intensity values for wavelength ranges excluding the red wavelength allow to conclude with certainty that the (solid or liquid) condensed phase on the colored surface of the cylinder corresponds to gas hydrate crystals.

The present invention thus enables reliable detection of the formation of hydrate crystals on a surface contacted with a fluid likely to generate hydrate crystals, with no possibility of confusion with a liquid phase.

The invention claimed is:

1. A device for detecting at least the presence of gas hydrate crystals formed from a fluid likely to form gas hydrate crystals, characterized in that said device comprises:
   A. a polychromatic light source likely to emit a radiation at least in the visible spectrum;
   B. a body whereof at least a portion is in contact with said fluid, said portion of said body comprising a reflecting surface having a predefined color, said predefined color being associated with a wavelength range in the visible spectrum;
   C. means for measuring a light intensity as a function of wavelength, so arranged as to detect a radiation re-emitted in a non-specular manner by said reflecting surface of said portion of said body having a predefined color when said reflecting surface of said portion of said body having a predefined color is illuminated by said polychromatic light source;
   D. means for detecting at least said presence of hydrate crystals from said light intensity measured as a function of wavelength and at least one predefined threshold.

2. A device as claimed in claim 1, wherein said polychromatic light source is a white LED source.

3. A device as claimed in claim 1, wherein said predefined color of said reflecting surface of said portion of said body is red.

4. A device as claimed in claim 1, wherein said means for measuring a light intensity as a function of wavelength comprise a spectrometer.

5. A device as claimed in claim 1, wherein said means for measuring a light intensity as a function of wavelength comprise a photodetector sensitive to the wavelengths of the visible spectrum, to the exclusion of said wavelength range associated with said predefined color of said reflecting surface of said portion of said body.

6. A device as claimed in claim 1, wherein said device is further able to detect the presence of a liquid phase on said reflecting surface of said portion of said body, and said device further comprises:
   a monochromatic light source emitting in said wavelength range associated with said predefined color of said reflecting surface of said portion of said body, and
   supplementary means for measuring a light intensity as a function of wavelength, comprising a photodetector sensitive to said wavelength range associated with said predefined color of said reflecting surface of said portion of said body, and so arranged as to detect a radiation resulting from an emission by said monochromatic light source and specularly reflected on said reflecting surface of said portion of said body.

7. A device as claimed in claim 6, wherein said monochromatic light source is a laser.

8. A device as claimed in claim 1, wherein said body is a metal cylinder whose one end is anodized, said anodized end corresponding to said reflecting surface of said portion of said body having a predefined color.

9. A device as claimed in claim 1, wherein said device further comprises means for adjusting the temperature of at least said reflecting surface of said portion of said body.

10. A method for detecting at least the presence of gas hydrate crystals formed from a fluid likely to form gas hydrate crystals, said method being implemented by means of device for detecting at least the presence of gas hydrate crystals formed by said fluid as claimed in claim 1, characterized in that said method comprises at least the following steps:
   I. emitting, by means of said polychromatic light source, a radiation at least in the visible spectrum through said fluid;
   II. measuring, using said means for measuring a light intensity as a function of wavelength, a light intensity as a function of the wavelength of a radiation re-emitted in a non-specular manner by said reflecting surface of said portion of said body having a predefined color when said reflecting surface of said portion of said body having a predefined color is illuminated by said polychromatic light source;
   III. determining that hydrate crystals are present on said reflecting surface of said portion of said body at least if said light intensity measured as a function of wavelength is above said predefined threshold for at least one wavelength outside said wavelength range associated with said predefined color of said reflecting surface of said portion of said body.

11. A method as claimed in claim 10, wherein said predefined threshold is at least equal to the detection threshold of said means for measuring a light intensity as a function of wavelength.

12. A method as claimed in claim 10, wherein said for detecting at least the presence of gas hydrate crystals formed by said fluid further comprises means for adjusting the temperature of at least said reflecting surface of said portion of said body, and wherein at least steps I) to III) are repeated for a plurality of decreasing temperatures of said reflecting surface of said portion of said body, said temperature of said reflecting surface of said portion of said body being lowered using said means for adjusting the temperature of at least said reflecting surface of said portion of said body, and a formation temperature of said gas hydrate crystals is further determined.

* * * * *